D. E. ROSS.
STEERING GEAR FOR VEHICLES.
APPLICATION FILED OCT. 4, 1909.

1,059,951.

Patented Apr. 22, 1913.

2 SHEETS—SHEET 1.

Witnesses:
Brennan B. West.
Oliver M. Kappler.

Inventor,
David E. Ross.
By Bauer, Fouts & Hull,
Attys.

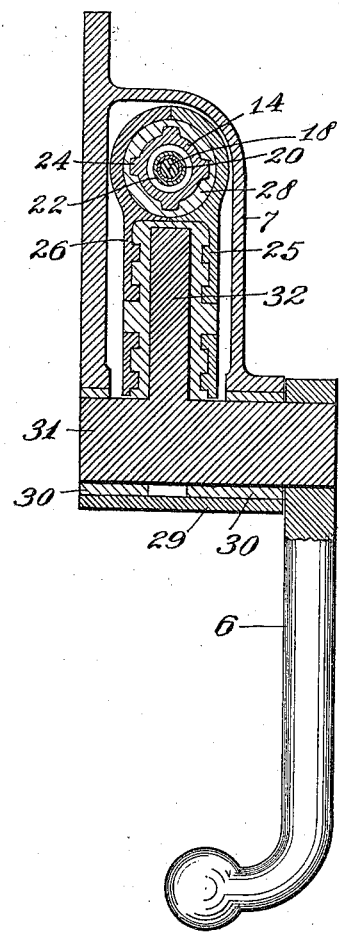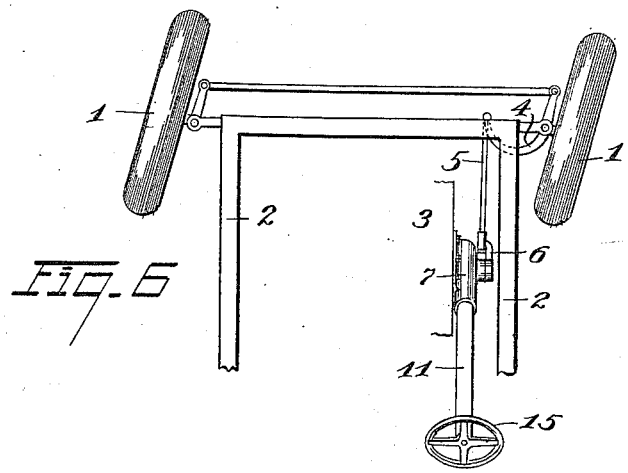

UNITED STATES PATENT OFFICE.

DAVID E. ROSS, OF BROOKSTON, INDIANA.

STEERING-GEAR FOR VEHICLES.

1,059,951.  Specification of Letters Patent.  Patented Apr. 22, 1913.

Application filed October 4, 1909. Serial No. 521,014.

*To all whom it may concern:*

Be it known that I, DAVID E. ROSS, a citizen of the United States, residing at Brookston, in the county of White and State of Indiana, have invented a certain new and useful Improvement in Steering-Gears for Vehicles, of which the following is a full, clear, and exact description, reference being had to the accompanying drawings.

This invention relates to steering gears for automobiles and like vehicles, the object of the invention being to simplify and cheapen the construction of such gears. In general, it may be stated that I attain this object by the use of a suitable and easily fusible metallic substance, such as babbitt, which is cast in the gear where there are movable contacting parts, thereby securing a close-fitting construction without the necessity of accurate machine work.

Figure 1:
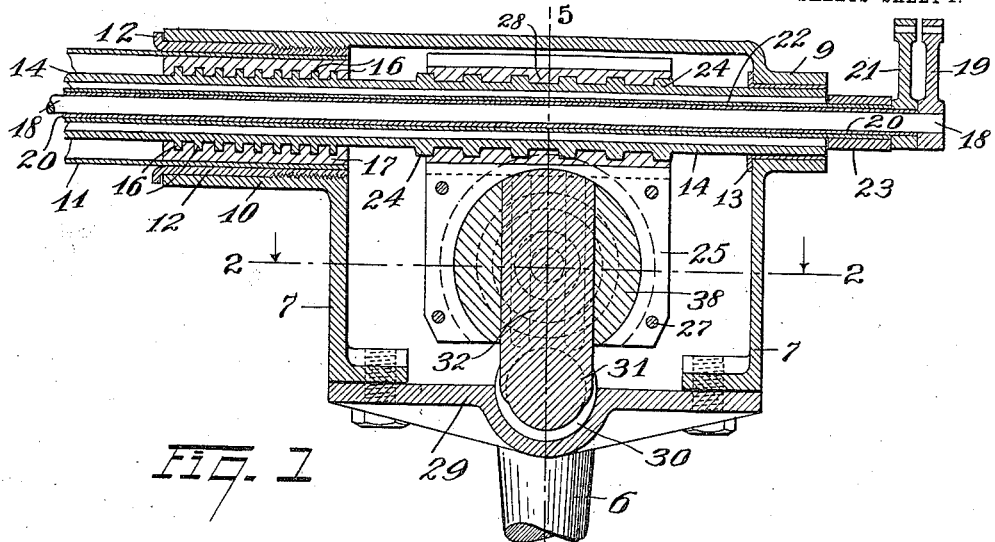
Figure 2:
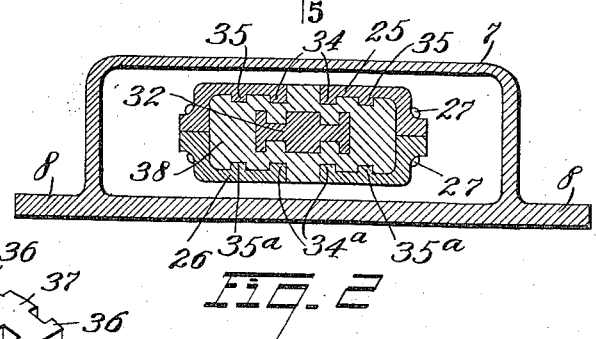
Figure 3:
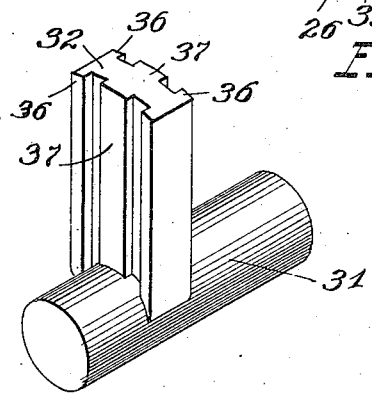
Figure 4:
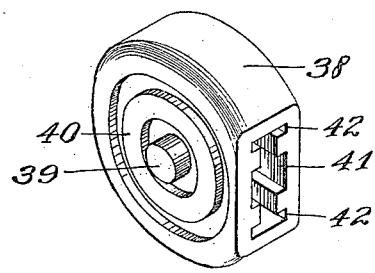

In the drawings forming a part of this application, Figure 1 is a longitudinal section taken centrally through the gear; Fig. 2 is a section taken on the line 2—2 of Fig. 1 and looking in the direction of the arrows thereon; Fig. 3 is a perspective view of the rock-shaft to which the steering crank is attached, said view also showing the stem through which motion is imparted to the shaft; Fig. 4 is a perspective view showing one of the cast pieces of Babbitt metal; Fig. 5 is a transverse sectional view taken on the line 5—5 of Fig. 1; and Fig. 6 is a diagrammatic plan view of a part of the frame or chassis of an automobile having my invention applied thereto.

Taking up a detailed description of the invention by the use of reference characters, 1, Fig. 6, represents the front wheels of a self-propelled vehicle; 2 represents a part of the frame; 3, a stationary member carried by the frame; 4, one of the steering knuckles for the wheels 1; 5, a pitman connected to said steering knuckle, and 6 the crank arm of the steering gear, the pitman being connected to said arm. The main housing for the steering gear is represented at 7, said housing being bolted, or otherwise secured, to the stationary member 3, or to any other suitable part of the vehicle.

As is shown, particularly in Figs. 2 and 5, the housing 7 is provided with a projecting flange 8, through which bolts may be passed for securing the housing in position. The housing is somewhat flat in its general contour, and toward one end it is provided with a longitudinal bore, sleeve extensions 9 and 10 projecting from the housing through which the said bore is formed. Through the sleeve 10 projects the lower end of the tubular steering post 11, said post being held in position by a sleeve nut 12 having exterior threads on its inner end so that the nut may be screwed into the housing. The sleeve 9 of the housing is lined with a bushing 13, forming the lower bearing for the tubular steering shaft 14. This shaft extends upwardly through the steering post 11, and it carries on its upper end the hand wheel 15 by means of which the shaft may be rotated.

The part of the shaft that is contained within the sleeve 10 is provided with a series of thrust collars 16, said collars being spaced from and centrally arranged within the steering post 11. The space between the shaft 14 and the steering post about the thrust collars 16 is filled with a suitable metallic substance 17, said substance being applied by first melting the same and then pouring it into the space about the thrust collars, where it becomes chilled. The said substance 17 is prevented from longitudinal movement in any suitable manner and, as it closely fits the shaft and thrust collars at all points, a suitable bearing for the shaft is provided. While I prefer to use Babbitt metal for forming this bearing, as well as the other chilled metallic bearings hereinafter referred to, any other suitable metallic substance may be used instead.

As shown, the shaft 14 is tubular in construction; and, centrally through the same, projects a shaft 18, to the lower end of which is secured a crank arm 19. Surrounding the shaft 18 is an elongated tube 20, said tube having secured to its lower end a crank arm 21. The tube 20 is likewise surrounded by a tubular bearing 22, and the crank 21 is spaced from the end of the shaft 14 by a collar 23 which surrounds the shaft 22. To the crank arms 19 and 21, suitable means are connected for operating the carbureter and sparking device, it being understood that means, not shown, are attached to the shaft 18 and sleeve 20 for rocking the same.

Within the housing 7, the shaft 14 is provided with exterior screw threads 24. Also within the housing is a member formed of two mated castings, 25 and 26, said castings being secured together in any suitable manner, as by rivets or bolts, which are indicated in Figs. 1 and 2 at 27. Through the said member, and in the same axial line with the bore through the housing, I provide a bore which surrounds the threaded part of the shaft 14. The diameter of this bore is larger than is the exterior diameter of the threads 24, so that a tubular space is provided between the said member and the threaded part of the shaft. Into this tubular space I pour melted babbitt, the same becoming chilled and forming an interiorly-threaded lining 28 for the bore of the member, said lining being held in place in any suitable manner.

That side of the housing 7 which is opposite the bore for the shaft 14, is closed by a cap-plate 29, the same being bolted or otherwise secured to the main housing. This cap-plate and the housing are bored transversely at a point opposite the center of the threaded part of the shaft 14, the bore being lined with bushing 30 within which I journal a short rock-shaft 31, the same being shown in perspective in Fig. 3. One of the ends of the shaft projects beyond the housing, and the steering crank 6 is attached to this projecting end. Secured to the rock-shaft, and preferably forged into one integral piece therewith, is what I shall term herein a stem 32, said stem extending radially from the shaft and lying in the same plane as the axis of the shaft 14, the latter shaft and the rock-shaft 31 extending at substantially right angles to each other. The two castings 25 and 26, which surround the shaft 14, extend substantially to the rock-shaft 31, but are spaced from each other so as to receive centrally therebetween the stem 32, a space being provided between said stem and the adjacent faces of said castings. This space is in the shape of a short cylinder with rounded edges. At the center of the side walls bounding this space, each of the plates is provided with an opening extending therethrough, a line passing through the centers of said openings, also passing through the central axis of the stem 32. Surrounding the central opening, the plate 25 is provided with an internal flange or bead 34, and, substantially midway between said flange and the outer face of the said space, the plate is provided with another annular flange or bead 35, said beads being concentric with respect to each other and to the central opening. The plate 26 is provided with corresponding circumferential beads or flanges 34ª and 35ª. The stem 32 is provided at each of its edges with projecting ribs or flanges 36, and with similar projecting ribs 37 on each side at the center, said ribs extending longitudinally of the stem. The cylindrical space between the plates 25 and 26 and surrounding the said stem is filled with Babbitt metal 38, said metal being poured into place after the said plates and the stem are assembled in their proper positions, the babbitt, when hardened, forming the casting shown in Fig. 4, which figure shows a central projection or axis 39, which projects into the central opening in plate 25, a concentric bead 40, which projects into the space between the ribs 34 and 35, and a socket 41 for the reception of the stem 32, said socket having the grooves 42 at the edges thereof for receiving the flanges 36 of the stem. From this description it will be understood that, as the shaft 14 is rotated back and forth, the member formed of the plates 25 and 26 and the Babbitt casting is reciprocated within the housing. As the rock-shaft 31 is journaled in stationary bearings, the Babbitt casting 38 is moved relatively thereto; and, as the stem 32 projects into said casting, the latter rotates in the cavity of the plates 25 and 26 and the stem moves back and forth in the socket 41. As the shaft 31 rocks, its motion is transmitted to the wheels 1 of the vehicle and the latter is thus steered.

Having thus described my invention, what I claim is:

1. In a steering gear, the combination with a stationary housing, of a threaded shaft extended through the housing and journaled therein so as to be incapable of longitudinal movement, exterior threads on the shaft within the housing, a member having a longitudinal bore surrounding the said threads on the shaft, the bore being of larger diameter than the exterior parts of the threads whereby a tubular space is provided between the member and shaft, Babbitt metal poured within said space and filling the same so as to provide threaded engagement between the member and shaft, the member being provided with a cylindrical cavity, a rock-shaft, a stem on the rock-shaft projecting into the cavity of the member at the center thereof, Babbitt metal poured into said cavity and surrounding said stem, the sides of said cavity having a circular groove concentric therewith and the cast Babbitt metal filling said groove, and a crank connected with the rock-shaft.

2. In a steering gear, the combination with a stationary housing, of a shaft extended through said housing and journaled therein, exterior screw threads on said shaft within the housing, a pair of mated plates secured together within the housing, said plates when assembled having a longitudinal opening therebetween, the said shaft extending through said opening and being spaced therefrom, an easily fusible metallic substance filling said opening about the threaded portion of said shaft, whereby screw threaded engagement with said shaft is provided, said plates also being spaced apart so as to form a cylindrical cavity opposite the longitudinal center of the said opening, a rock-shaft journaled in the housing, a crank secured to said shaft, means connected with said crank for steering, a stem rigidly connected with the shaft and projecting into the cylindrical cavity between the said plates, and an easily fusible metallic substance molded in the said cavity and surrounding the said stem, the construction being such that when the threaded shaft is rotated back and forth, said plates are moved longitudinally of the shaft, the said metallic substance is turned in the cylindrical cavity and the said stem is moved in said metallic substance.

3. In a steering gear, the combination with a stationary housing, of a shaft extended through said housing and journaled therein, exterior screw threads on said shaft within the housing, a pair of mated metal plates within the housing, means for securing said plates together, the adjacent faces of the plates being so formed as to provide, between the plates, a longitudinal bore and a cylindrical cavity, the said bore surrounding the threaded portion of the shaft, but being spaced therefrom, Babbitt metal cast within the said bore about the threaded part of the shaft whereby screw threaded engagement is provided between the plates and the shaft, a crank shaft journaled in the housing, a crank on said shaft, a stem rigidly projecting from the crank shaft into the said cylindrical cavity and Babbitt metal cast in said cavity and surrounding the said stem.

4. In a steering gear, the combination with a stationary hollow housing having oppositely projecting hub extensions, there being a bore through the housing and through said extensions, a steering shaft extended through said housing and journaled in the hub extensions, a member within the housing, said member having a bore therethrough and a cylindrical cavity therein, the said bore surrounding the steering shaft and being spaced therefrom, exterior screw threads on the shaft within the bore of the member, Babbitt metal molded within the said bore about the threaded portion of the shaft, a crank shaft journaled in the housing, a crank connected to said shaft, a stem rigidly connected with the crank shaft and projecting into the said cavity, concentric ribs extending into said cavity from each side thereof, and Babbitt metal filling said cavity about said stem.

5. In a steering gear, the combination with a stationary housing, of hub-like projections extending from said housing, a steering shaft extended through the housing, a tubular steering post surrounding the steering shaft and spaced therefrom, said post projecting into one of the said extensions, a sleeve nut surrounding the steering post and having threaded engagement with the housing, thrust collars projecting from the said shaft, Babbitt metal molded into the space between the steering post and the steering shaft, said metal surrounding said thrust collars, exterior screw threads on the steering shaft within the housing, a pair of metal plates within the housing, said plates being secured together and having their adjacent faces so formed as to provide a longitudinal bore and a cylindrical cavity, said bore surrounding the threaded portion of the steering shaft, Babbitt metal cast in the said bore about the threads of said shaft, a rock-shaft journaled in the housing, a crank secured to said rock-shaft, a ribbed stem rigidly connected with the crank shaft and projecting into the said cavity, and Babbitt metal cast in said cavity and surrounding the said stem, the sides of the cavity being provided with a central opening and with circular ribs surrounding the said opening, whereby the Babbitt metal therein is journaled between the said plates.

6. In a steering gear, the combination with a stationary housing, hub-like projections extending from said housing, a steering shaft extended through the housing, a tubular steering post surrounding the steering shaft and spaced therefrom, said post projecting into one of the said extensions, a sleeve nut surrounding the steering post and having threaded engagement with the housing, thrust collars projecting from the said shaft, Babbitt metal molded into the space between the steering post and the steering shaft, said metal surrounding said thrust collars, exterior screw threads on the steering shaft within the housing, a member within the housing, said member being provided with a longitudinal bore and with a cylindrical cavity, said bore surrounding the threaded portion of the steering shaft, Babbitt metal cast in the said bore about the threads of said shaft, a rock-shaft journaled in the housing, a crank secured to said rock-shaft, a ribbed stem rigidly connected with the crank shaft and projecting into the cavity in the said member, and Babbitt metal cast in said cavity and surrounding the said stem, the sides of the cavity being provided with a central opening and with circular ribs surrounding the said opening, whereby the Babbitt metal therein is journaled in the said cavity.

In testimony whereof, I hereunto affix my signature in the presence of two witnesses.

DAVID E. ROSS.

Witnesses:
D. L. Ross,
Edward A. Ross.